(No Model.)

A. F. W. PARTZ.
VOLTAIC BATTERY.

No. 252,619. Patented Jan. 24, 1882.

Witnesses:
L. Genès.
C. Bailly

Inventor:
August F. W. Partz.

UNITED STATES PATENT OFFICE.

AUGUST F. W. PARTZ, OF PHILADELPHIA, PENNSYLVANIA.

VOLTAIC BATTERY.

SPECIFICATION forming part of Letters Patent No. 252,619, dated January 24, 1882.

Application filed November 14, 1881. (No model.) Patented in France April 22, 1880, and May 28, 1880.

*To all whom it may concern:*

Be it known that I, AUGUST F. W. PARTZ, of Philadelphia, in the State of Pennsylvania, have invented certain Improvements in Voltaic Batteries, of which the following is a full and exact description, reference being had to the accompanying drawings, which form part of this specification.

This invention relates to voltaic batteries with cathodes of carbon; and it consists, first, in the employment, as electrolyte, of a compound aqueous solution of chloride of zinc and bichromate of ammonia, in combination with an anode of zinc and a cathode of carbon; second, in a cathode of carbon slotted by saw-cuts or otherwise, so as to form a row or cluster of connected bars, for the double purpose of increasing its surface and of securing a free communication of the exciting-liquid.

Figure 1:
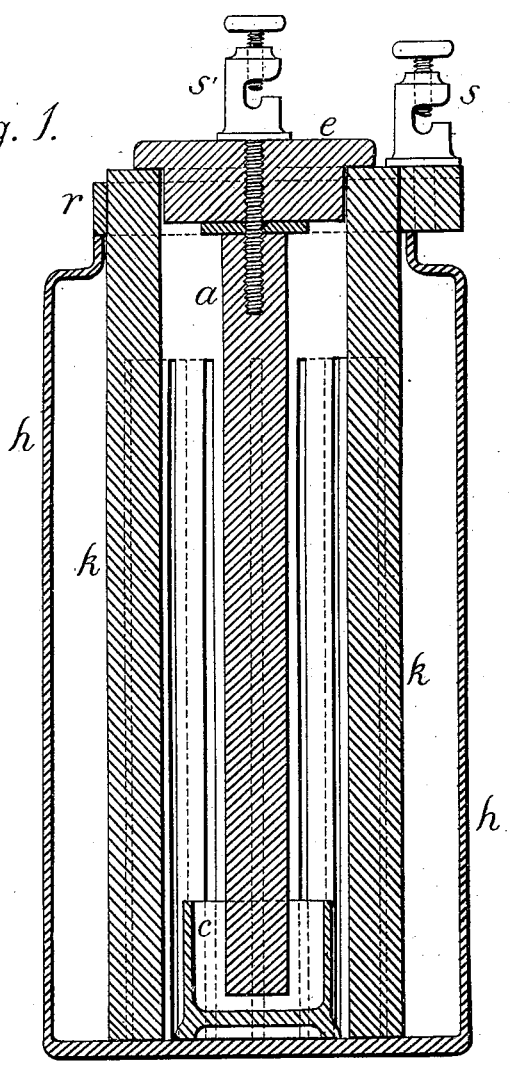
Figure 2:
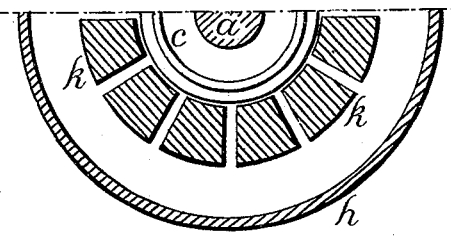

Referring to the drawings, Figure 1 is a vertical section, and Fig. 2 a transverse demi-section, of a one-liquid voltaic element embodying the méchanical part of my invention.

In a glass jar, $h$, stands a hollow cylinder of carbon, $k$, slotted lengthwise, so as to represent a circular row of bars connected at their upper ends, where a metallic ring, $r$, bearing a binding-screw, $s$, is fitted round the cylinder. The bars may be left connected also at their lower ends, in which case the slotting is conveniently done by means of a circular saw or a rapidly-rotating toothless iron disk. Instead of being cut, the carbons may also be molded so as to contain a series of slots. Within the cylinder $k$ is suspended a bar of zinc, $a$, by being screwed over the stem of a binding-screw, $s'$, which stem extends through a circular block of varnished wood or ebonite, $e$, provided with a flange that rests on the cylinder $k$. The zinc bar should be amalgamated with mercury, and in order to maintain its amalgamation, especially in elements of large dimensions, I let it dip in mercury contained in a small glass cup, $c$, placed on the bottom of the jar $h$. The cylinder $k$ may, instead of being slotted, be perforated with holes, though this involves more labor and affords no advantage.

The new electrolyte which I employ is prepared by dissolving about fifteen parts of chloride of zinc and an equal quantity of bichromate of ammonia in one hundred parts of water. An element containing such a solution and made as above described has an initial electro-motive force of 1.65 volts, and a resistance of 1.6 ohms. While the circuit remains open the zinc is not acted upon by the liquid. When it is closed an olive-green salt (chrom oxychloride of zinc) forms upon the anode, from which it gradually peels off, falling down as a powder. The formation of this salt has, because of its slight adherence to the zinc, no noticeable effect upon the electric current; but as it represents the negative electrolytic product in a solid state, while the positive (hydrogen and ammonia) escapes as gas, the liquid remains qualitatively unchanged, and it is therefore necessary only to supply from time to time what it has lost in quantity and to renew the zinc when it is consumed to keep a battery of this kind for an indefinite period in serviceable condition. The liquid has no tendency to produce efflorescence.

Although I deem the element shown in the drawings peculiarly well adapted for a one-liquid battery, I do not restrict myself with regard to the employment of a compound solution of chloride of zinc and bichromate of ammonia to any particular form of voltaic apparatus, provided that the electrodes consist of zinc and carbon. Nor do I restrict myself with regard to the use of slotted cathodes of carbon to any special shape of them or to any special kind of batteries, since their shape may be varied so as to accord with that of the elements for which they are intended, and they may be employed with equal advantage in double-cell as in single-cell batteries.

For the new binding-screw shown in the drawings I intend to make a special application for a patent.

I claim as my invention—

1. The combination, in a voltaic battery, of a compound solution of chloride of zinc and bichromate of ammonia with an anode of zinc and a cathode of carbon.

2. A cathode of carbon slotted so as to form a row or cluster of connected bars, substantially as and for the purpose set forth.

AUGUST F. W. PARTZ.

Witnesses:
L. GENÈS,
C. BAILLY.